(12) United States Patent
Noguchi et al.

(10) Patent No.: US 9,068,048 B2
(45) Date of Patent: Jun. 30, 2015

(54) INTERMEDIATE TRANSFER MEMBER FOR TRANSFER INK JET RECORDING

(71) Applicant: Canon Kabushiki Kaisha, Tokyo (JP)

(72) Inventors: Mitsutoshi Noguchi, Kawaguchi (JP); Midori Kushida, Tokyo (JP); Yoshikazu Saito, Inagi (JP); Mamiko Kaji, Kawasaki (JP); Hikaru Ueda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/320,328

(22) Filed: Jun. 30, 2014

(65) Prior Publication Data

US 2014/0313270 A1    Oct. 23, 2014

Related U.S. Application Data (62) Division of application No. 13/813,091, filed as application No. PCT/JP2011/066784 on Jul. 15, 2011, now Pat. No. 8,802,221.

(30) Foreign Application Priority Data

Jul. 30, 2010  (JP) ................................. 2010-172933

(51) Int. Cl.
| | |
|---|---|
| B41M 5/00 | (2006.01) |
| B44C 1/17 | (2006.01) |
| G03G 7/00 | (2006.01) |
| C08G 77/12 | (2006.01) |
| B41J 2/005 | (2006.01) |
| B41M 5/025 | (2006.01) |
| B41M 5/03 | (2006.01) |
| B41M 5/52 | (2006.01) |
| C08L 83/04 | (2006.01) |
| C09D 183/04 | (2006.01) |

(52) U.S. Cl.
CPC ......... *C08G 77/12* (2013.01); *Y10T 428/24802* (2015.01); *B41J 2/0057* (2013.01); *B41M 5/0256* (2013.01); *B41M 5/03* (2013.01); *B41M 5/529* (2013.01); *B41M 5/52* (2013.01); *C08L 83/04* (2013.01); *C09D 183/04* (2013.01); *Y10S 428/914* (2013.01)

(58) Field of Classification Search
CPC ...... C08G 77/12; C09D 183/04; C08L 83/04; B41J 2/0057; B41M 5/0256; B41M 5/03; B41M 5/529; B41M 5/52

USPC ................................ 347/105; 428/195.1, 447
See application file for complete search history.

(56) References Cited

U.S. PATENT DOCUMENTS

| | | | |
|---|---|---|---|
| 5,582,941 A | 12/1996 | Kato et al. | |
| 2003/0087061 A1 | 5/2003 | Tashiro | |
| 2006/0152566 A1 | 7/2006 | Taniuchi et al. | |
| 2007/0065607 A1 * | 3/2007 | Kurachi et al. | 428/32.51 |
| 2010/0060703 A1 | 3/2010 | Ohara | |
| 2013/0127965 A1 | 5/2013 | Kushida | |
| 2014/0313270 A1 * | 10/2014 | Noguchi et al. | 347/103 |

FOREIGN PATENT DOCUMENTS

| | | |
|---|---|---|
| EP | 1226971 A2 | 7/2002 |
| EP | 1384596 A1 | 1/2004 |
| JP | H07-017030 A | 1/1995 |
| JP | H09-101633 A | 4/1997 |
| JP | 11-227177 A | 8/1999 |
| JP | 2001-060044 A | 3/2001 |
| JP | 2001-228641 A | 8/2001 |
| JP | 2003-005430 A | 1/2003 |
| JP | 2003-182064 A | 7/2003 |
| JP | 2003202785 A | 7/2003 |
| JP | 2004-174834 A | 6/2004 |
| JP | 2004-279738 A | 10/2004 |
| JP | 2007-237413 A | 9/2007 |
| JP | 2008-018719 A | 1/2008 |
| JP | 2010-002567 A | 1/2010 |
| JP | 2010-113118 A | 5/2010 |

* cited by examiner

*Primary Examiner* — Betelhem Shewareged
(74) *Attorney, Agent, or Firm* — Canon USA Inc. IP Division (57) ABSTRACT

There is provided an intermediate transfer member for transfer ink jet recording to which inks and coagulants can be satisfactorily applied and that can substantially maintain high water repellency through repetitive transfer.

An intermediate transfer member for use in transfer ink jet recording, wherein an outer portion of the intermediate transfer member contains a component produced by condensing at least an organosilicon compound having the following general formula (1):

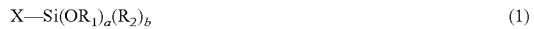

$$X\text{—}Si(OR_1)_a(R_2)_b \quad (1)$$

wherein X denotes a substituent having a vinyl group or a cyclic ether group, $R_1$ denotes a hydrogen atom or an alkyl group having 1 to 4 carbon atoms, $R_2$ denotes an alkyl group having 1 to 20 carbon atoms, a is a natural number in the range of 1 to 3, b is an integer in the range of 0 to 2, and a+b=3.

6 Claims, 1 Drawing Sheet

INTERMEDIATE TRANSFER MEMBER FOR TRANSFER INK JET RECORDING

CROSS REFERENCE TO RELATED APPLICATIONS

This application is a Divisional of U.S. patent application Ser. No. 13/813,091 filed Jan. 29, 2013 which was a 371 national phase filing of International Application No. PCT/JP2011/066784, filed on Jul. 15, 2011, which claims priority to Japanese Patent Application No. 2010-172933 filed Jul. 30, 2010, all of which are hereby incorporated by reference herein in their entireties.

TECHNICAL FIELD

The present invention relates to an intermediate transfer member for transfer ink jet recording.

BACKGROUND ART

In a known transfer ink jet recording method, ink is applied to an image-forming surface of an intermediate transfer member with an ink jet device to form an intermediate image, which is then transferred to a recording medium by pressing. Intermediate transfer members for use in such a transfer ink jet recording method preferably have a surface from which intermediate images can be easily removed (transferability).

It has been believed that intermediate transfer members should have a low surface free energy to hold intermediate images on the intermediate transfer members and to ensure high transferability to recording media. Thus, intermediate transfer members generally have a surface (the outer portion) formed of a material having a low surface free energy or high water repellency, such as a fluoropolymer or a silicone resin (see PTL 1). The surface free energy of such intermediate transfer members is such that "the contact angle of pure water", which is a representative measure, is approximately 110 degrees.

CITATION LIST

Patent Literature

PTL 1 Japanese Patent Laid-Open No. 11-227177

SUMMARY OF INVENTION

Technical Problem

An ink and optionally a coagulant are applied to an image-forming surface of an intermediate transfer member for use in a transfer ink jet recording method to form intermediate images. The image-forming surface must therefore have moderate wettability for the ink and the coagulant and smoothly transfer the intermediate images to recording media.

A study by the present inventors showed that the intermediate transfer member described in PTL 1 sometimes repelled inks or coagulants and failed to form intermediate images.

Furthermore, the water repellency of the intermediate transfer member sometimes decreased as intermediate images were repeatedly transferred. This resulted in different image qualities over time.

Accordingly, the present invention provides an intermediate transfer member for transfer ink jet recording to which inks and coagulants can be satisfactorily applied and that can substantially maintain high water repellency through repetitive transfer.

Solution to Problem

The present invention provides an intermediate transfer member for use in a transfer ink jet recording method, the method including an intermediate image forming process of applying an ink to an image-forming surface of the intermediate transfer member with an ink jet device to form an intermediate image and a transfer process of transferring the intermediate image to a recording medium by pressing, wherein an outer portion of the intermediate transfer member contains a component produced by condensing at least an organosilicon compound having the following general formula (1):

$$X\text{---}Si(OR_1)_a(R_2)_b \quad (1)$$

wherein X denotes a substituent having a vinyl group or a cyclic ether group, $R_1$ denotes a hydrogen atom or an alkyl group having 1 to 4 carbon atoms, $R_2$ denotes an alkyl group having 1 to 20 carbon atoms, a is a natural number in the range of 1 to 3, b is an integer in the range of 0 to 2, and a+b=3.

Advantageous Effects of Invention

The present invention can provide an intermediate transfer member for transfer ink jet recording to which inks and coagulants can be satisfactorily applied and that can substantially maintain high water repellency through repetitive transfer.

DESCRIPTION OF EMBODIMENTS

The present invention will be described in detail below.

Intermediate Transfer Member for Transfer Ink Jet Recording

Figure 1:
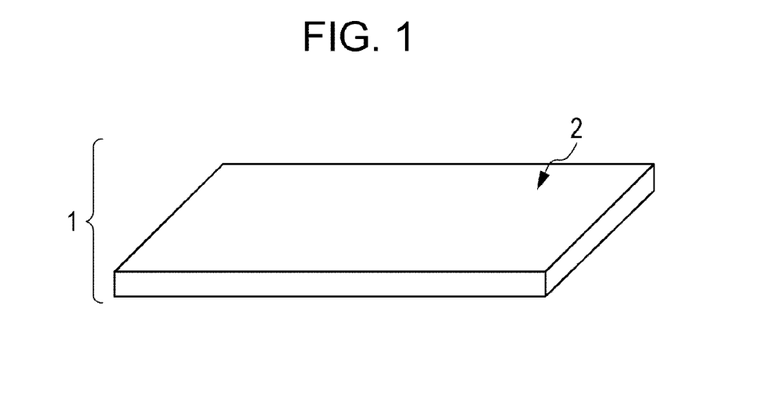
FIG. 1 is a schematic view of an intermediate transfer member according to an embodiment of the present invention.

FIG. 1 is a schematic view of an intermediate transfer member for transfer ink jet recording according to an embodiment of the present invention. An intermediate transfer member 1 has an outer portion 2. An image-forming surface of the intermediate transfer member 1 is disposed on the outer portion 2 (the top side). An ink can be applied to the image-forming surface with an ink jet device to form intermediate images.

Intermediate images are transferred to recording media, such as paper, by pressing the intermediate images against the recording media. The intermediate transfer member according to an embodiment of the present invention can therefore have moderate elasticity. When the recording medium is plain paper, the intermediate transfer member preferably contains a rubber material having a durometer A hardness of 10 or more and 100 or less, more preferably 20 or more and 60 or less, in accordance with JIS K 6253.

The intermediate transfer member may be a monolayer or a multilayer. The intermediate transfer member may have a compression layer to make the pressure on a recording medium uniform. The compression layer may be formed of a known material, such as porous rubber or elastomer. The intermediate transfer member may have a resin layer, a base fabric layer, and/or a metal layer to improve its elastic properties, strength, and thermal properties. The size of the intermediate transfer member can be determined in accordance with the size of images to be printed. The intermediate transfer member may have a shape of a sheet, roll, drum, belt, or endless web.

The term "the outer portion", as used herein, refers to a portion on the top side of an intermediate transfer member. As described below, the outer portion contains a component produced by condensing an organosilicon compound having the general formula (1). The presence of the component produced by condensing an organosilicon compound having the general formula (1) on an image-forming surface or the top surface of an intermediate transfer member is essential for the advantages of the present invention. The outer portion may be an exposed portion on a surface of an intermediate transfer member and is not necessarily a layer. The outer portion may be a region on the top side of a monolayer intermediate transfer member. The outer portion may have any thickness. The outer portion may be formed as a layer by applying a coating liquid containing a component produced by condensing an organosilicon compound having the general formula (1).

The outer portion may have a thickness of 0.01 μm or more and 10.00 μm or less. In the case that the outer portion is formed by the application of a coating liquid, the outer portion having a thickness of less than 0.01 μm has insufficient strength. Thus, a stress produced by the elastic deformation of the intermediate transfer member in the transfer process may cause cracking or delamination of the outer portion. On the other hand, the outer portion having a thickness of more than 10.00 μm has limited elastic deformation and cannot follow the surface profile of a recording medium, resulting in poor transferability.

In order to prevent the cracking or delamination of the outer portion and poor transferability, it is desirable that the outer portion be sufficiently bonded to a layer adjacent to the outer portion. A surface (on which the outer portion is to be formed) of the layer adjacent to the outer portion may be treated to improve adhesiveness. Examples of the surface treatment include, but are not limited to, frame treatment, corona treatment, plasma treatment, polishing treatment, roughening treatment, active energy beam irradiation treatment (UV, IR, RF, etc.), ozone treatment, and surfactant treatment. These treatments may be performed in combination. A silane coupling agent or a sulfur-containing compound may be added to a coating liquid for use in the formation of the outer portion to improve adhesiveness and coatability. A coating liquid for use in the formation of the outer portion may be applied by various known methods. Examples of the methods include, but are not limited to, die coating, blade coating, and gravure rollers. These may be combined with offset rollers.

The intermediate transfer member may contain a resin compound, such as polyurethane, or a ceramic material. The intermediate transfer member may contain an elastomer or a rubber material to improve processability. Examples of the elastomer and rubber material include, but are not limited to, fluorosilicone rubber, phenyl silicone rubber, fluorocarbon rubber, chloroprene rubber, nitrile rubber, ethylene propylene rubber, natural rubber, styrene rubber, isoprene rubber, butadiene rubber, ethylene/propylene/butadiene copolymer, and nitrile butadiene rubber. In particular, silicone rubber, fluorosilicone rubber, phenyl silicone rubber, fluorocarbon rubber, and chloroprene rubber can be used to improve dimensional stability, durability, and heat resistance.

The present inventors found that it is not necessary to reduce the surface energy or increase the water repellency of the intermediate transfer member to ensure high transferability. The present inventors also found that an outer portion of an intermediate transfer member containing a component produced by condensing at least an organosilicon compound having the following general formula (1) can ensure high transferability:

wherein X denotes a substituent having a vinyl group or a cyclic ether group, $R_1$ denotes a hydrogen atom or an alkyl group having 1 to 4 carbon atoms, $R_2$ denotes an alkyl group having 1 to 20 carbon atoms, a is a natural number in the range of 1 to 3, b is an integer in the range of 0 to 2, and a+b=3.

$R_1$ may be a hydrogen atom, a methyl group, an ethyl group, a propyl group, or an isopropyl group in consideration of reactivity. The alkyl groups of $R_1$ and $R_2$ may be substituted or unsubstituted. X denotes a substituent having a vinyl group or a cyclic ether group. The component produced by condensing a compound is hereinafter also referred to as a condensation product.

An organosilicon compound having the general formula (1) has at least one ($OR_1$) bonded to Si. ($OR_1$)s bonded to Si can form a siloxane bond through hydrolysis and dehydration condensation. In other words, ($OR_1$)s bonded to Si allow the condensation reaction of an organosilicon compound having the general formula (1). The condensation reaction of an organosilicon compound having the general formula (1) herein refers to a reaction to produce a compound having a siloxane bond.

A component produced by condensing an organosilicon compound having the general formula (1) has a vinyl group or a cyclic ether group. Since the vinyl group or the cyclic ether group can be polymerized, the organosilicon compound having the general formula (1) can be polymerized through the vinyl group or the cyclic ether group. Thus, the organosilicon compound having the general formula (1) can be condensed to form a siloxane bond while the organosilicon compound having the general formula (1) is polymerized. The condensation may be preceded or followed by the polymerization. A combination of the condensation and the polymerization can grow the organic skeleton of a component produced by condensing the organosilicon compound having the general formula (1), thereby improving the alkali resistance (ink resistance) of the component. A compound produced by the polymerization of the vinyl group or the cyclic ether group may have less reduction in water repellency.

X— of the general formula (1) may have the following formula (a) or (b):

[Chem. 1]

wherein $R_5$ denotes an alkylene group having 1 to 5 carbon atoms, $R_6$ denotes an alkylene group having 1 to 4 carbon atoms, and $R_7$ denotes a hydrogen atom or a methyl group, or

[Chem. 2]

(b)

wherein $R_5$ denotes an alkylene group having 1 to 5 carbon atoms, and $R_6$ denotes an alkylene group having 1 to 4 carbon atoms.

An intermediate transfer member according to an embodiment of the present invention preferably has a contact angle of pure water of 100 degrees or less, more preferably 80 degrees or less. A low contact angle of pure water can prevent a coagulant or an ink from being repelled by the intermediate transfer member. The contact angle of pure water can be measured with a common contact angle meter.

Repeated use of an intermediate transfer member may result in a reduction in water repellency. A reduction in water repellency may change the conditions of a coagulant or an ink on the surface, resulting in variations in image quality through the repeated use. Thus, it is important to prevent the reduction in the water repellency of an intermediate transfer member caused by the repeated use. An intermediate transfer member according to an embodiment of the present invention contains on the outer portion a component produced by condensing an organosilicon compound having the general formula (1) and can therefore substantially maintain high water repellency.

The outer portion of an intermediate transfer member according to an embodiment of the present invention preferably contains 10% by mass or more, more preferably 30% by mass or more, still more preferably 50% by mass or more, and 100% by mass or less of a component produced by condensing an organosilicon compound having the general formula (1).

A component produced by condensing an organosilicon compound having the general formula (1) may be produced by condensing an organosilicon compound having the general formula (1) and an organosilicon compound having the following general formula (2):

(2)

wherein $R_3$ denotes a hydrogen atom or an alkyl group having 1 to 4 carbon atoms, $R_4$ denotes an alkyl group having 1 to 20 carbon atoms, c and d are independently a natural number in the range of 1 to 3, and c+d=4.

$R_3$ may be a hydrogen atom, a methyl group, an ethyl group, a propyl group, or an isopropyl group in consideration of reactivity. The alkyl groups of $R_3$ and $R_4$ may be substituted or unsubstituted.

In the organosilicon compounds having the general formula (1) and the general formula (2), the introduction of a long-chain alkyl group into $R_2$ and $R_4$ can improve compatibility with another resin and make their structures flexible. This is probably because the presence of a flexible skeleton like the long-chain alkyl group as a side chain can enhance the movement of the molecular chain and thereby promote internal stress relaxation. However, an excessively large number of carbon atoms of $R_2$ and $R_4$ results in excessive hydrophobicity, making uniform hydrolysis and condensation difficult. Thus, $R_2$ and $R_4$ may independently be an alkyl group having 20 or less carbon atoms. $R_2$ and $R_4$ may independently be an alkyl group having 3 or more carbon atoms to impart flexibility to the structure. Furthermore, $R_2$ and $R_4$ may independently be an alkyl group having 10 or less carbon atoms to avoid excessive hydrophobicity.

In a component produced by condensing an organosilicon compound having the general formula (1) and an organosilicon compound having the general formula (2), the mass ratio of the organosilicon compound having the general formula (1) to the organosilicon compound having the general formula (2) preferably ranges from 1:9 to 9:1, more preferably 3:7 to 7:3.

Examples of an organosilicon compound having the general formula (1) include, but are not limited to, glycidoxypropyltrimethoxysilane, glycidoxypropyltriethoxysilane, glycidoxypropylmethyldimethoxysilane, glycidoxypropylmethyldiethoxysilane, glycidoxypropyldimethylmethoxysilane, glycidoxypropyldimethylethoxysilane, 2-(epoxycyclohexyl)ethyltrimethoxysilane, and 2-(epoxycyclohexyl)ethyltriethoxysilane; compounds in which the epoxy group of the aforementioned compounds is substituted with an oxetanyl group; and acryloxypropyltrimethoxysilane, acryloxypropyltriethoxysilane, acryloxypropylmethyldimethoxysilane, acryloxypropylmethyldiethoxysilane, acryloxypropyldimethylmethoxysilane, acryloxypropyldimethylethoxysilane, methacryloxypropyltrimethoxysilane, methacryloxypropyltriethoxysilane, methacryloxypropylmethyldimethoxysilane, methacryloxypropylmethyldiethoxysilane, methacryloxypropyldimethylmethoxysilane, and methacryloxypropyldimethylethoxysilane.

Examples of an organosilicon compound having the general formula (2) include, but are not limited to, methyltrimethoxysilane, methyltriethoxysilane, dimethyldimethoxysilane, dimethyldiethoxysilane, trimethylmethoxysilane, trimethylethoxysilane, propyltrimethoxysilane, propyltriethoxysilane, hexyltrimethoxysilane, hexyltriethoxysilane, decyltrimethoxysilane, and decyltriethoxysilane.

Organosilicon compounds having the general formula (1) and the general formula (2) have 1 to 3 $(OR_1)$s and $(OR_3)$s, respectively, on a silicon atom in the general formulae (1) and (2). These groups $(OR_1)$s and $(OR_3)$s can form a siloxane bond through hydrolysis and dehydration condensation. The number of groups that can form a siloxane bond on a single silicon atom is herein defined as the number of functional groups of the compound. A siloxane bond skeleton formed by the condensation reaction is important for the present invention. An intermediate transfer member is pressed against a recording medium, such as paper, to transfer intermediate images. Thus, it is desirable that the intermediate transfer member follow the surface profile of the recording medium. A condensation product for use in an intermediate transfer member according to an embodiment of the present invention should therefore have a skeleton resistant to deformation. In other words, the condensation product should have a flexible structure that can relieve deformation stress. As a result of investigation, the present inventors found that the characteristics of a condensation product produced by condensing an organosilicon compound having the general formula (1) and an organosilicon compound having the general formula (2) depend on the content and the number of functional groups of the condensation product. For example, the flexibility of the condensation product decreases with an increase in the number of functional groups. Thus, a condensation product having a smaller number of functional groups has higher flexibility. Condensation between a trifunctional (the number of functional groups is 3) organosilicon compound and a trifunctional organosilicon compound can produce a skeleton having the highest degree of three-dimensional cross-linking. This is followed by a combination of trifunctional and bifunctional, which is followed by a combination of bifunctional and bifunctional. In this order, the three-dimensional cross-linked structure becomes difficult to form and a linear structure becomes easy to form. In general, a three-dimensional cross-linked structure has low flexibility, and a linear structure has high flexibility. Thus, considering crack resistance alone, a smaller number of functional groups is preferred.

When the number of functional groups is one, a monofunctional organosilicon compound terminates the siloxane skeleton and contributes to a low cross-linking density and high crack resistance. However, the monofunctional organosilicon compound cannot form a resin skeleton, possibly resulting in poor coatability and film-forming properties. Thus, the number of functional groups of a siloxane skeleton and the ratio of an organosilicon compound having the general formula (1) to an organosilicon compound having the general formula (2) are determined taking crack resistance, coating performance, and film-forming properties into account.

"a" and "c" of the general formula (1) and the general formula (2) indicate the numbers of functional groups. Preferably, a+c≥4, more preferably a≥2 and c≥2, still more preferably a=2 and c=2. A monofunctional organosilicon compound may be 30% by mole or less of the whole condensation product.

The condensation reaction of an organosilicon compound can be performed at a high temperature in the presence of water by hydrolysis and condensation. The temperature, time, pH, and other variables of hydrolysis and condensation can be controlled to achieve a desired degree of condensation. An acid catalyst or an alkaline catalyst may be used. The degree of condensation can be defined by the ratio of the number of condensed functional groups to the number of condensable functional groups and can practically be determined by Si-NMR. For example, the degree of condensation of a trifunctional organosilicon compound can be determined as follows:

T0 moiety: a silicon atom not bonded to the other silicon atoms through oxygen,

T1 moiety: a silicon atom bonded to one silicon atom through oxygen,

T2 moiety: a silicon atom bonded to two silicon atoms through oxygen, and

T3 moiety: a silicon atom bonded to three silicon atoms through oxygen.

$$\text{Degree of condensation (\%)} = \frac{(T1 + 2 \times T2 + 3 \times T3)}{3 \times (T0 + T1 + T2 + T3)} \times 100 \quad [\text{Math. 1}]$$

For example, the degree of condensation of a bifunctional organosilicon compound can be determined as follows:

D0 moiety: a silicon atom not bonded to the other silicon atoms through oxygen,

D1 moiety: a silicon atom bonded to one silicon atom through oxygen, and

D2 moiety: a silicon atom bonded to two silicon atoms through oxygen.

$$\text{Degree of condensation (\%)} = \frac{(D1 + 2 \times D2)}{2 \times (D0 + D1 + D2)} \times 100 \quad [\text{Math. 2}]$$

The degree of condensation depends on the type of organosilicon compound and the synthesis conditions. An excessively low degree of condensation may result in poor coating performance and film-forming properties. Thus, the degree of condensation is preferably 20% or more, more preferably 30% or more.

The degree of condensation can be controlled by using an organometallic compound as a hydrolysis catalyst in the hydrolysis reaction. The organometallic compound contains silicon, titanium, zirconium, or aluminum as the central metal. Examples of the organometallic compound include, but are not limited to, titanium alkoxide, zirconium alkoxide, aluminum alkoxide, and complexes thereof (such as acetylacetonate complexes). These organometallic compounds may be added during the condensation reaction of an organosilicon compound or may be added to a condensation product of the organosilicon compound.

The outer portion of an intermediate transfer member according to an embodiment of the present invention contains a component produced by condensing an organosilicon compound as described above and may be polymerized through a vinyl group or a cyclic ether group.

Examples of cationic polymerization initiators for use in the polymerization include, but are not limited to, photocationic polymerization initiators, which generate cationic species or broensted acids by photoirradiation, or thermal cationic polymerization initiators, which generate cationic species or broensted acids by heat. Specific examples of cationic polymerization initiators include, but are not limited to, onium salts, borate salts, triazine compounds, azo compounds, and peroxides. The cationic polymerization initiators may be aromatic sulfonium salts and aromatic iodonium salts to improve sensitivity, stability, reactivity, and solubility. The cationic polymerization initiators may be used alone or in combination.

When a cationic polymerization initiator is used, the outer portion of an intermediate transfer member may contain a resin capable of cationic polymerization. A resin capable of cationic polymerization contains a compound having a group capable of cationic polymerization, such as a vinyl group or a cyclic ether group. The cyclic ether group may be an epoxy group or an oxetanyl group. Examples of resins having an epoxy group include, but are not limited to, bisphenol epoxy resins composed of a monomer or oligomer having a bisphenol skeleton, such as bisphenol A diglycidyl ether or bisphenol F diglycidyl ether, phenol novolak epoxy resins, cresol novolak epoxy resins, trisphenolmethane epoxy resins, and resins having an alicyclic epoxy structure, such as 3,4-epoxycyclohexenylmethyl-3',4'-epoxycyclohexene carboxylate. Examples of the resins containing an oxetane compound include, but are not limited to, resins containing phenol novolak oxetane compounds, cresol novolak oxetane compounds, trisphenolmethane oxetane compounds, bisphenol oxetane compounds, or biphenol oxetane compounds. A combined use of an epoxy resin and a resin containing an oxetane compound can promote a curing reaction.

Examples of radical polymerization initiators for use in polymerization include, but are not limited to, photo radical polymerization initiators, which generate radical species by photoirradiation, and thermal radical polymerization initiators, which generate radical species by heat. Specific examples of the radical polymerization initiators include, but are not limited to, organic peroxides, such as dialkyl peroxides, diacyl peroxides, ketone peroxides, peroxyketals, hydroperoxides, and peroxyesters, azo compounds, carbonyl compounds, such as benzophenone and benzophenone compounds, acetophenone compounds, benzoin and benzoin ether compounds, amino carbonyl compounds, and thioxanthones, sulfides, and peroxides. The radical polymerization initiators may be used alone or in combination.

When a radical polymerization initiator is used, the outer portion of an intermediate transfer member may contain a resin capable of radical polymerization. A resin capable of radical polymerization contains a compound having a group capable of radical polymerization, such as a vinyl group. The compound having a group capable of radical polymerization may be a compound having an acryloyl group, a methacryloyl group, or a styryl group. Examples of the resin capable of radical polymerization include, but are not limited to, polymers of polymerizable monomers, mixtures of homopolymers of polymerizable monomers, and copolymers of at least two polymerizable monomers. Examples of polymerizable monomers include, but are not limited to, (meth)acrylate monomers, such as methyl(meth)acrylate, ethyl(meth)acrylate, propyl(meth)acrylate, n-butyl(meth)acrylate, isobutyl (meth)acrylate, and 2-ethylhexyl(meth)acrylate; and styrene monomers, such as styrene, o-methylstyrene, m-methylstyrene, p-methylstyrene, α-methylstyrene, vinylnaphthalene, 2-ethylstyrene, 3-ethylstyrene, and 4-ethylstyrene.

When the outer portion of an intermediate transfer member contains a resin capable of cationic polymerization or a resin capable of radical polymerization, the outer portion may contain a resin having a large functional group equivalent or a known resin having a linear skeleton so as to have sufficient flexibility. The outer portion may contain 5% by mass or more and 50% by mass or less of such a resin. The thickness, hardness, and elastic modulus of each layer of an intermediate transfer member are appropriately determined so as to improve long-term stability as well as optimizing the structure of the intermediate transfer member to be compatible with various types of recording media, the retention of images on the intermediate transfer member, the efficiency in transferring images to a recording medium, and the quality of transferred images.

The outer portion of an intermediate transfer member can be formed by active energy beam irradiation or heat curing. The outer portion thus formed has a small uniform thickness and high mechanical strength. This also contributes to high transferability. Furthermore, the outer portion strongly adheres to its adjacent layer and consequently has high durability. The active energy beam may be an electron beam or X-rays. Use of ultraviolet rays can improve workability.

In order to improve coatability, a coating liquid for use in the formation of the outer portion may contain an additive agent, such as a surfactant or a cocatalyst for promoting curing. The outer portion may be formed by solvent-free coating. In this case, the whole coated film is cured to form the outer portion.

In a transfer ink jet recording method, the surface energies of inks and coagulants used are generally 20 mN/m or more and 50 mN/m or less. In the present invention, in order to appropriately apply liquids to an intermediate transfer member, both moderate wettability and transferability are important for the surface design of the intermediate transfer member.

Furthermore, in order to form better intermediate images on an intermediate transfer member and improve the retention of the intermediate images on the intermediate transfer member, the intermediate transfer member may have an average surface roughness Ra of 0.01 μm or more and 3.00 μm or less.

Transfer Ink Jet Recording Apparatus

Figure 2:
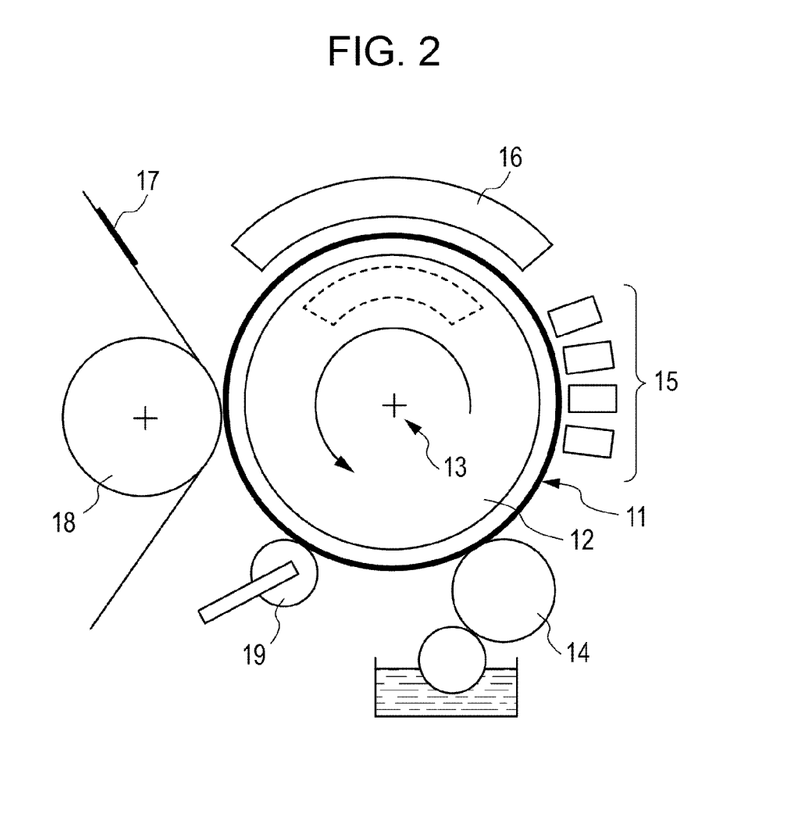
FIG. 2 is a schematic view of a transfer ink jet recording apparatus according to an embodiment of the present invention.

FIG. 2 illustrates a transfer ink jet recording apparatus according to an embodiment of the present invention. In FIG. 2, a coagulant is applied to an image-forming surface of an intermediate transfer member 11 with a coating roller 14. An ink is applied to the image-forming surface with an ink jet device 15 to form an intermediate image. The intermediate image on the intermediate transfer member 11 is pressed against a recording medium 17 with a pressing roller 18 to transfer the intermediate image to the recording medium 17.

The intermediate transfer member 11 is disposed on a supporting member 12. The supporting member 12 rotates on a shaft 13 in the direction of the arrow. The devices surrounding the intermediate transfer member 11 operate in synchronism with the rotation. The supporting member 12 has a sufficient structural strength with respect to durability and the accuracy with which the recording medium 17 is transported. The material of the supporting member 12 may be a metal, ceramic, or resin. In particular, because of its high rigidity resistant to transfer pressure, dimensional accuracy, and reduced operational inertia to improve control responsivity, the material of the supporting member 12 may be aluminum, iron, stainless, an acetal resin, an epoxy resin, polyimide, polyethylene, poly(ethylene terephthalate), nylon, polyurethane, silica ceramic, or alumina ceramic. These materials may be used in combination. The structure of the supporting member 12 depends on the type of the recording apparatus or the process of transferring intermediate images to a recording medium. For example, the supporting member 12 may be a roller or a belt. Use of a supporting member in the form of a drum or an endless web allows the repeated use of an intermediate transfer member, thereby improving productivity.

Application of Coagulant

A coagulant may be applied to an intermediate transfer member before the application of an ink. The coagulant may be applied by any known method. Examples of the method include, but are not limited to, die coating, blade coating, and gravure rollers. These may be combined with offset rollers. The coagulant may be applied with an ink jet device at high speed with high precision.

The coagulant can contain a thickener. A thickener can reduce the flowability of an ink and/or an ink composition on an intermediate transfer member, thereby reducing bleeding or beading. For example, in the formation of images with an ink jet device, a considerable amount of ink may be applied per unit area. This tends to cause bleeding or beading. However, a coagulant on an intermediate transfer member can reduce the flowability of an ink during the formation of images. This can reduce bleeding or beading and consequently results in better image quality.

The thickener is appropriately selected in accordance with the type of ink. For example, a coagulant containing a polymer flocculant can be used for a dye ink. For a pigment ink containing fine particles dispersed therein, the pigment ink can contain a coagulant containing a polyvalent metal ion or a coagulant containing a pH-adjusting agent, such as an acid buffer solution. The thickener may also be a compound having a plurality of ionic groups, such as a cationic polymer. These compounds may be used in combination. Specific examples of the polymer flocculant used as a thickener include, but are not limited to, cationic polymer flocculants, anionic polymer flocculants, nonionic polymer flocculants, and amphoteric polymer flocculants.

Examples of metal ions for use in the thickeners include, but are not limited to, divalent metal ions, such as $Ca^{2+}$, $Cu^{2+}$, $Ni^{2+}$, $Mg^{2+}$, $Sr^{2+}$, $Ba^{2+}$, and $Zn^{2+}$, and trivalent metal ions, such as $Fe^{3+}$, $Cr^{2+}$, $Y^{2+}$, and $Al^{2+}$. A coagulant containing such a metal ion can be applied as an aqueous solution of its metal salt. Examples of anions of the metal salt include, but are not limited to, $Cl^-$, $NO_3^-$, $CO_3^{2-}$, $SO_4^{2-}$, $I^-$, $Br^-$, $ClO_3^-$, $HCOO^-$, and $RCOO^-$ (wherein R denotes an alkyl group). The concentration of metal salt in the aqueous solution is preferably 0.01% by mass or more, more preferably 0.1% by mass or more, and preferably 20% by mass or less.

Examples of the pH-adjusting agent in the thickener include, but are not limited to, acid solutions having a pH of less than 7.0. Examples of the acids include, but are not limited to, inorganic acids, such as hydrochloric acid, phosphoric acid, sulfuric acid, nitric acid, and boric acid, and organic acids, such as oxalic acid, poly(acrylic acid), acetic acid, glycolic acid, malonic acid, malic acid, maleic acid, ascorbic acid, succinic acid, glutaric acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumaric acid, thiophencarboxylic acid, nicotinic acid, and derivatives thereof. These salts may be used as solutions.

An acid buffer solution (buffer) having pH-buffering ability in a coagulant can reduce variations in the pH of the coagulant even when the coagulant is diluted with an ink, thereby preventing reduction in the reactivity between the coagulant and the ink. The pH-buffering ability may be achieved by the addition of a buffering agent to a coagulant. Examples of the buffering agent include, but are not limited to, acetates, such as sodium acetate, potassium acetate, and lithium acetate, hydrogen phosphates, hydrogen carbonates, and hydrogen salts of polyvalent carboxylic acids, such as sodium hydrogen phthalate and potassium hydrogen phthalate. Examples of the polyvalent carboxylic acids include, but are not limited to, phthalic acid, malonic acid, maleic acid, succinic acid, fumaric acid, itaconic acid, phthalic acid, isophthalic acid, terephthalic acid, adipic acid, sebacic acid, dimer acid, pyromellitic acid, and trimellitic acid. Other known compounds having pH-buffering ability may also be used.

These coagulants may be prepared by dissolving a thickener as described above in an aqueous medium. Examples of the aqueous medium include, but are not limited to, water and mixed solvents of water and aqueous organic solvents. Specific examples of the aqueous organic solvents include, but are not limited to, alkanediols, such as 1,3-butanediol, 1,5-pentanediol, 1,2-hexanediol, and 1,6-hexanediol; glycol ethers, such as diethylene glycol monomethyl (or ethyl) ether and triethylene glycol monoethyl (or butyl)ether; alkyl alcohols having 1 to 4 carbon atoms, such as ethanol, isopropanol, n-butanol, isobutanol, secondary butanol, and tertiary butanol; carboxylic acid amides, such as N,N-dimethylformamide and N,N-dimethylacetamide; ketones, such as acetone, methyl ethyl ketone, 2-methyl-2-hydroxypentane-4-one, and keto-alcohols; cyclic ethers, such as tetrahydrofuran and dioxane; glycerin; alkylene glycols, such as ethylene glycol, diethylene glycol, triethylene glycol, tetraethylene glycol, 1,2- and 1,3-propylene glycol, 1,2- and 1,4-butylene glycol, and poly(ethylene glycol); polyhydric alcohols, such as thiodiglycol, 1,2,6-hexanetriol, and acetylene glycol derivatives; 2-pyrrolidone, N-methyl-2-pyrrolidone, and 1,3-dimethyl-2-imidazolidinone; and sulfur-containing compounds, such as dimethyl sulfoxide. These aqueous organic solvents may be used in combination. If necessary, the coagulant may further contain an antifoaming agent, a preservative, and/or a fungicide.

The coagulant may further contain a resin to improve transferability or image fastness property. The resin can increase the adhesion of intermediate images on a recording medium and the mechanical strength of the intermediate images. A certain type of resin may improve the water-fastness of final images on a recording medium. Any resin compatible with a thickener may be used for this purpose. Examples of such a resin include, but are not limited to, organic polymers, such as poly(vinyl alcohol) and polyvinylpyrrolidone. The resin may react with an ink component to form a cross-link. For example, polyoxazoline or polycarbodiimide can react with carboxylic acids, which are frequently used to disperse coloring materials in inks, to form a cross-link. These resins may be dissolved in the solvent of a coagulant or in the form of emulsion or suspension. The coagulant may further contain a surfactant to control surface tension.

Intermediate Image Forming Process

An ink is applied to the image-forming surface of the intermediate transfer member 11 with the ink jet device 15. In FIG. 2, an ink is applied to the image-forming surface to which a coagulant has been applied. Examples of the ink jet device include, but are not limited to, devices for discharging an ink by causing film boiling of the ink with an electrothermal transducer to form air bubbles, devices for discharging an ink with an electromechanical transducer, and devices for discharging an ink utilizing static electricity. The devices including an electrothermal transducer can perform high-speed high-density printing.

The ink jet device may have any structure. The ink jet device may have a line head or a shuttle head. The line head includes ink nozzles aligned in the direction of movement of an intermediate transfer member (in the rotation direction for a drum). In the shuttle head, the head is scanned perpendicularly to the direction of movement of an intermediate transfer member.

Examples of inks for use in the present invention include, but are not limited to, inks widely used as ink jet inks, more specifically, various inks containing a coloring material, such as a dye, carbon black, or an organic pigment, dissolved and/or dispersed therein. Inks containing carbon black or an organic pigment can produce images having excellent weatherability and color developability.

The ink may be an aqueous ink. The aqueous ink may contain 45.0% by mass or more water. The coloring material content of the ink is preferably 0.1% by mass or more, more preferably 0.2% by mass or more, and preferably 15.0% by mass or less, more preferably 10.0% by mass or less. Examples of the coloring material include, but are not limited to, dyes, pigments, and resins associated therewith. The coloring materials may be known coloring materials described in Japanese Patent Laid-Open No. 2008-018719.

The inks may further contain a water-soluble resin or a water-soluble cross-linker to improve the image fastness property of images finally formed on a recording medium. Any water-soluble resin or water-soluble cross-linker compatible with the other ink components may be used.

In a transfer ink jet recording method according to an embodiment of the present invention, an ink having just been transferred to a recording medium principally contains a coloring material and a high-boiling organic solvent. It is therefore effective for the ink to contain an organic solvent to improve transferability. Examples of the organic solvent include, but are not limited to, water-soluble solvents having a high boiling point and a low vapor pressure, such as alkanediols, such as 1,3-butanediol, 1,5-pentanediol, 1,2-hexanediol, and 1,6-hexanediol; glycol ethers, such as diethylene glycol monomethyl (or ethyl) ether and triethylene glycol monoethyl (or butyl)ether; alkyl alcohols having 1 to 4 carbon atoms, such as ethanol, isopropanol, n-butanol, isobutanol, secondary butanol, and tertiary butanol; carboxylic acid amides, such as N,N-dimethylformamide and N,N-dimethylacetamide; ketones, such as acetone, methyl ethyl ketone, 2-methyl-2-hydroxypentane-4-one, and keto-alcohols; cyclic ethers, such as tetrahydrofuran and dioxane; glycerin; alkylene glycols, such as ethylene glycol, diethylene glycol, triethylene glycol, tetraethylene glycol, 1,2- and 1,3-propylene glycol, 1,2- and 1,4-butylene glycol, and poly(ethylene glycol); polyhydric alcohols, such as thiodiglycol and 1,2,6-hexanetriol; heterocyclic compounds, such as 2-pyrrolidone, N-methyl-2-pyrrolidone, 1,3-dimethyl-2-imidazolidinone, and N-methylmorpholine; and sulfur-containing compounds, such as dimethyl sulfoxide. These organic solvents may be used in combination.

If necessary, an ink according to an embodiment of the present invention may further contain various additive agents, such as a pH-adjusting agent, an anticorrosive, a preservative, a fungicide, an antioxidant, a reduction inhibitor, a neutralizing agent for a water-soluble resin, and a salt. If necessary, an ink according to an embodiment of the present invention may further contain a surfactant to control the surface tension of the ink. The surfactant may be any compound that does not significantly affect the storage stability of the ink. Examples of the surfactant include, but are not limited to, anionic surfactants, such as fatty acid salts, higher alcohol sulfate salts, liquid fatty oil sulfate salts, and alkyl allyl sulfonates, and nonionic surfactants, such as polyoxyethylene alkyl esters, polyoxyethylene sorbitan alkyl esters, acetylenic alcohols, and acetylene glycols. These surfactants may be used in combination.

The ink composition depends on the discharging power of an ink jet head selected and its nozzle diameter.

Drying Process

Referring to FIG. 2, the liquid content of an intermediate image is reduced with a heater 16. Excessive liquid of an intermediate image may overflow in the subsequent transfer process. This sometimes affects the intermediate image or impairs transferability. The liquid content may be reduced by any known method. Examples of the method include, but are not limited to, a heating method, a dry air method, a vacuuming method, and a method using an absorbent. These methods may be combined. Natural drying may also be performed.

Transfer Process

After the drying process, an intermediate image on an image-forming surface of an intermediate transfer member is transferred to a recording medium by pressing, producing a printed material on which a final image is recorded. Examples of the recording medium include, but are not limited to, plain paper and glossy paper for use in general printing, cloths, plastics, films, and other media to be printed. A recording medium may be pressed against the intermediate transfer member with a pressure roller 18 to efficiently transfer an intermediate image. Multistep pressurization can also improve transferability.

Cleaning Process

An intermediate transfer member is sometimes used continuously to improve productivity. In such continuous operation, an image-forming surface of the intermediate transfer member may be cleaned with a cleaning roller 19 before the formation of images. The cleaning may be performed by any known method. Examples of the cleaning method include, but are not limited to, a cleaning shower method, a wiping method using a dampening roller, a method in which an image-forming surface is brought into contact with a cleaning liquid surface, a scraping method using a wiper blade, and methods utilizing various energies. These methods may be combined.

EXAMPLES

Examples and comparative examples of the present invention will be described below. Intermediate transfer members for transfer ink jet recording according to examples and comparative examples of the present invention were prepared in the following manner.

First, a hydrolyzable condensation product was synthesized by the following procedure. A constitutional unit A and a constitutional unit B were mixed in accordance with Table 1 and were heated in water under reflux using hydrochloric acid as a catalyst for 24 hours or more, producing a solution containing a hydrolyzable condensation product. With a single constitutional unit, the constitutional unit was condensed alone.

TABLE 1

| | Intermediate transfer member | | | | | | | |
|---|---|---|---|---|---|---|---|---|
| | Outer portion | | | | | | | |
| | Condensation product | | | | | | Additive agent | |
| | Constitutional unit A | | | Constitutional unit B | | | | |
| | Compound | a | Content [mol %] | Compound | c | Content [mol %] | Compound | Content [phr] | Main body |
| Example 1 | GPTES | 3 | 100 | — | — | — | — | — | Silicone rubber |
| Example 2 | GPTES | 3 | 50 | MTES | 3 | 50 | — | — | Silicone rubber |
| Example 3 | GPTES | 3 | 50 | MTES | 3 | 50 | — | — | Urethane rubber |
| Example 4 | GPTES | 3 | 30 | MTES | 3 | 70 | — | — | Silicone rubber |
| Example 5 | GPTES | 3 | 10 | MTES | 3 | 90 | — | — | Silicone rubber |
| Example 6 | GPTES | 3 | 50 | MTES | 5 | 50 | EX-212 | 10 | Silicone rubber |
| Example 7 | GPTES | 3 | 50 | MTES | 3 | 50 | EX-212 | 50 | Silicone rubber |
| Example 8 | GPTES | 3 | 50 | MTES | 3 | 50 | EX-212 | 100 | Silicone rubber |
| Example 9 | GPMDES | 2 | 50 | MTES | 3 | 50 | — | — | Silicone rubber |
| Example 10 | GPTES | 3 | 50 | DMDES | 2 | 50 | — | — | Silicone rubber |
| Example 11 | GPMDES | 2 | 50 | DMDES | 2 | 50 | — | — | Silicone rubber |
| Example 12 | GPMDES | 2 | 50 | DMDES | 2 | 50 | EX-212 | 10 | Silicone rubber |
| Example 13 | GPMDES | 2 | 50 | DMDES | 2 | 50 | TC-310 | 10 | Silicone rubber |
| Example 14 | GPDMES | 1 | 30 | MTES | 3 | 70 | — | — | Silicone rubber |
| Example 15 | GPTES | 3 | 70 | TMES | 1 | 30 | — | — | Silicone rubber |
| Example 16 | GPTES | 3 | 50 | HexylTES | 3 | 50 | — | — | Silicone rubber |
| Example 17 | MPTES | 3 | 50 | MTES | 3 | 50 | — | — | Silicone rubber |
| Example 18 | MPMDES | 2 | 50 | MTES | 3 | 50 | — | — | Silicone rubber |
| Example 19 | MPTES | 3 | 50 | DMDES | 2 | 50 | — | — | Silicone rubber |
| Example 20 | MPMDES | 2 | 50 | DMDES | 2 | 50 | — | — | Silicone rubber |
| Comparative example 1 | — | — | — | MTES | 3 | 100 | — | — | Urethane rubber |

TABLE 1-continued

| | Intermediate transfer member | | | | | | | |
|---|---|---|---|---|---|---|---|---|
| | Outer portion | | | | | | | |
| | Condensation product | | | | | Additive agent | | |
| | Constitutional unit A | | | Constitutional unit B | | | | |
| | Compound | a | Content [mol %] | Compound | c | Content [mol %] | Compound | Content [phr] | Main body |
| Comparative example 2 | FAS17 | — | 10 | MTES | 3 | 90 | — | — | Urethane rubber |
| Comparative example 3 | MTES | (c = 3) | 50 | DMDES | 2 | 50 | — | — | Urethane rubber |
| Comparative example 4 | — | — | — | MTES | 3 | 100 | — | — | Silicone rubber |
| Comparative example 5 | FAS17 | — | 10 | MTES | 3 | 90 | — | — | Silicone rubber |
| Comparative example 6 | MTES | (c = 3) | 50 | DMDES | 2 | 50 | — | — | Silicone rubber |

The abbreviations in Table 1 stand for the following compounds. "a" denotes a natural number in the general formula (1). "c" denotes a natural number in the general formula (2).

Compounds Having the General Formula (1):
GPTES: glycidoxypropyltriethoxysilane
GPMDES: glycidoxypropylmethyldiethoxysilane
GPDMES: glycidoxypropyldimethylethoxysilane
MPTES: methacryloxypropyltriethoxysilane
MPMDES: methacryloxypropylmethyldiethoxysilane Compounds Having the General Formula (2):
MTES: methyltriethoxysilane
DMDES: dimethyldiethoxysilane
TMES: trimethylethoxysilane
HexylTES: hexyltriethoxysilane Other Compounds:
FAS17: 1H,1H,2H,2H-perfluorodecyltriethoxysilane EX-212 in Table 1 represents a resin compound (additive agent) 1,6-hexanedioldiglycidyl ether (trade name: Denacol EX-212, manufactured by Nagase ChemteX Corp.). TC-310 represents an organometallic compound (additive agent) titanium dihydroxybis(lactate) (trade name: TC-310, manufactured by Matsumoto Fine Chemical Co., Ltd.). The amounts added were based on 100 parts by mass of the hydrolyzable condensation product (phr).

The solution containing the hydrolyzable condensation product was then diluted with methyl isobutyl ketone to 15% by mass. In Examples 1 to 16 and Comparative Examples 1, 2, 4, and 5, on the basis of the total solids, 5% by mass of a cationic photoinitiator (trade name: SP150, manufactured by Adeka Corp.) was added. In Examples 17 to 20, on the basis of the total solids, 5% by mass of a photo radical polymerization initiator (trade name: IRGACURE 184, manufactured by Ciba Japan K.K.) was added. A coating liquid for forming the outer portion was thus prepared.

Next, a PET film having a thickness of 0.05 mm was coated with silicone rubber or urethane rubber having a rubber hardness of 40 and a thickness of 0.2 mm to prepare the main body of the intermediate transfer member. The coating liquid was applied to the main body by spin coating to form the outer portion. The outer portion was then heated at 120° C. for two hours by UV radiation for curing. The thickness of the outer portion was 1.0 μm in the intermediate transfer member.

Evaluation

The intermediate transfer member described above was evaluated in a transfer ink jet recording apparatus illustrated in FIG. 2. The supporting member of the intermediate transfer member was a cylindrical drum made of an aluminum alloy.

A coagulant was prepared by adding a surfactant and additive agents to a 13% by mass aqueous solution of calcium chloride ($CaCl_2 \cdot 2H_2O$) to control the surface tension and the viscosity of the coagulant. The coagulant was continuously applied to the intermediate transfer member with a roller coater. An ink was ejected from an ink jet device onto an image-forming surface of the intermediate transfer member to form an intermediate image (mirror image). The ink jet device included an electrothermal transducer and could eject an ink in an on-demand manner. The ink was a pigment ink containing a resin dispersant and had the following composition.

| | |
|---|---|
| C.I. pigment blue 15 | 3.0 parts by mass |
| Styrene-acrylic acid-ethyl acrylate copolymer (acid value 240, weight-average molecular weight 5000) | 1.0 part by mass |
| Glycerin | 10.0 parts by mass |
| Ethylene glycol | 5.0 parts by mass |
| Acetylenol (trade name) E100 | 0.5 parts by mass |
| Ion-exchanged water | 80.5 parts by mass |

Variations in Contact Angle

The contact angle of pure water on an intermediate transfer member surface was measured in an initial state before the coagulant was applied. The contact angle was measured with an automatic contact angle meter DM-501 (manufactured by Kyowa Interface Science Co., Ltd.).

An intermediate image formed by the method described above was transferred to a recording medium to form a final image. The recording medium was a roll of PET film (thickness 150 μm) subjected to hydrophilic treatment. After the transfer was performed 30,000 times, the contact angle of pure water was measured as described above.

A variation in the contact angle of pure water on the intermediate transfer member resulting from the repetitive transfer was evaluated in accordance with the following criteria:
A: a variation of less than 5%,
B: a variation of 5% or more and less than 10%, and
C: a variation of 10% or more.

Spreadability of Coagulant

The uniformity of the coagulant applied to the intermediate transfer member was visually evaluated in accordance with the following criteria:

A: uniform,
B: substantially uniform, and
c: nonuniform.

Crack Resistance

After the transfer was performed 30,000 times, the crack resistance of the outer portion of the intermediate transfer member was visually evaluated in accordance with the following criteria:

AA: no crack was observed after the transfer was performed 30,000 times,

A: although no crack was observed after the transfer was performed 20,000 times, a crack was observed after 30,000 times, and B: although no crack was observed after the transfer was performed 10,000 times, a crack was observed after 20,000 times.

Table 2 shows the results.

TABLE 2

|  | Contact angle of pure water | | | | |
|---|---|---|---|---|---|
|  | Initial state [degrees] | After repetitive transfer [degrees] | Evaluation | Spreadability of Coagulant | Crack resistance |
| Example 1 | 62 | 62 | A | A | B |
| Example 2 | 68 | 68 | A | A | B |
| Example 3 | 66 | 66 | A | A | B |
| Example 4 | 73 | 73 | A | A | B |
| Example 5 | 76 | 73 | A | A | B |
| Example 6 | 70 | 70 | A | A | A |
| Example 7 | 72 | 70 | A | A | AA |
| Example 8 | 74 | 72 | A | A | AA |
| Example 9 | 92 | 94 | A | B | A |
| Example 10 | 89 | 90 | A | B | A |
| Example 11 | 93 | 92 | A | B | AA |
| Example 12 | 94 | 93 | A | B | AA |
| Example 13 | 83 | 83 | A | B | A |
| Example 14 | 95 | 93 | A | B | A |
| Example 15 | 94 | 93 | A | B | A |
| Example 16 | 95 | 94 | A | B | B |
| Example 17 | 65 | 65 | A | A | B |
| Example 18 | 70 | 71 | A | A | A |
| Example 19 | 68 | 70 | A | A | A |
| Example 20 | 85 | 83 | A | B | AA |
| Comparative example 1 | 76 | 60 | C | A | B |
| Comparative example 2 | 107 | 85 | C | C | B |
| Comparative example 3 | 91 | 72 | C | B | A |
| Comparative example 4 | 76 | 60 | C | A | B |
| Comparative example 5 | 107 | 85 | C | C | B |
| Comparative example 6 | 91 | 72 | C | B | A |

As shown in Table 2, the intermediate transfer members according to Examples 1 to 20, which had a component produced by condensing an organosilicon compound having the general formula (1) on the outer portion, exhibited insignificant variations in water repellency through the repetitive transfer. Variations in image quality were also negligible.

In contrast, the intermediate transfer members according to Comparative Examples 1 to 6, which had no component produced by condensing an organosilicon compound having the general formula (1) on the outer portion, exhibited significant variations in water repellency through the repetitive transfer. Furthermore, variations in image quality were also significant, resulting in unstable image recording. The intermediate transfer member according to Comparative Examples 2 and 4 repelled the coagulant, resulting in nonuniform coating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-172933, filed Jul. 30, 2010, which is hereby incorporated by reference herein in its entirety.

The invention claimed is:

1. A transfer ink jet recording method comprising:
an intermediate image forming process of applying ink to an image-forming surface of an intermediate transfer member with an ink jet device to form an intermediate image, and
a transfer process of transferring the intermediate image to a recording medium by pressing,
wherein an outer portion of the intermediate transfer member contains a component produced by condensing at least an organosilicon compound having the following general formula (1):

$$X\text{---}Si(OR_1)_a(R_2)_b \qquad (1)$$

wherein X denotes a substituent having a vinyl group or a cyclic ether group, $R_1$ denotes a hydrogen atom or an alkyl group having 1 to 4 carbon atoms, $R_2$ denotes an alkyl group having 1 to 20 carbon atoms, a is a natural number in the range of 1 to 3, b is an integer in the range of 0 to 2, and a+b=3.

2. The transfer ink jet recording method according to claim 1, wherein X— of the organosilicon compound having the general formula (1) has the following formula (a) or (b):

[Chem. 1]

(a)

wherein $R_5$ denotes an alkylene group having 1 to 5 carbon atoms, $R_6$ denotes an alkylene group having 1 to 4 carbon atoms, and $R_7$ denotes a hydrogen atom or a methyl group, or

[Chem. 2]

(b)

wherein $R_5$ denotes an alkylene group having 1 to 5 carbon atoms, and $R_6$ denotes an alkylene group having 1 to 4 carbon atoms.

3. The transfer ink jet recording method according to claim 1, wherein the component is produced by condensing the organosilicon compound having the general formula (1) and an organosilicon compound having the following general formula (2):

$$Si(OR_3)_c(R_4)_d \quad (2)$$

wherein $R_3$ denotes a hydrogen atom or an alkyl group having 1 to 4 carbon atoms, $R_4$ denotes an alkyl group having 1 to 20 carbon atoms, c and d are independently a natural number in the range of 1 to 3, and c+d=4.

4. The transfer ink jet recording method according to claim 3, wherein a and c satisfy a+c≥4.

5. The transfer ink jet recording method according to claim 3, wherein a and c satisfy a≥2 and c≥2.

6. The transfer ink jet recording method according to claim 1, wherein the component is further polymerized through the vinyl group or the cyclic ether group.

* * * * *